Sept. 5, 1933.  E. F. PRINDLE  1,925,675
BASKET HANDLE
Filed Nov. 16, 1931
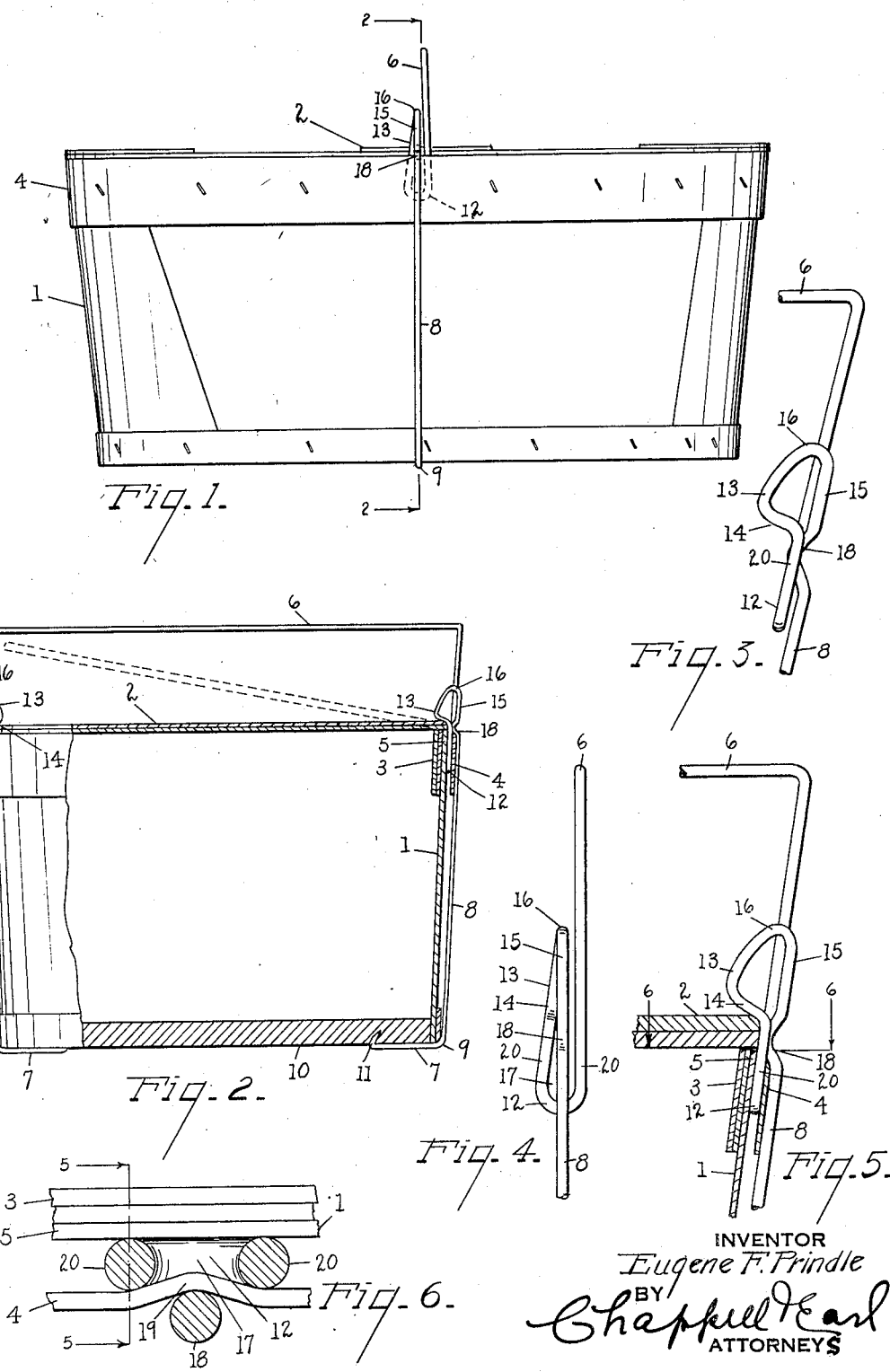
INVENTOR
Eugene F. Prindle
BY
Chappell & Earl
ATTORNEYS Patented Sept. 5, 1933

1,925,675

UNITED STATES PATENT OFFICE 1,925,675

BASKET HANDLE

Eugene F. Prindle, Lawton, Mich.

Application November 16, 1931
Serial No. 575,213

3 Claims. (Cl. 217—125)

This application is, in the main, a continuation of my application for Leters Patent filed January 14, 1927, Serial No. 161,082.

The main objects of the invention are:

First, to provide an improved handle which may be readily engaged with a basket, such as a fruit basket or like receptacle, without the aid of tools, and which is very secure.

Second, to provide an improved handle of this class which securely engages and retains the cover, at the same time permitting easy removal thereof.

Third, to provide a handle having means associated therewith for securely clamping the outer hoop of the rim of the receptacle to support the handle without distortion.

Objects relating to details and economies of my invention will appear from the description to follow. The invention is defined and pointed out in the claims.

A structure which is a preferred embodiment of my invention is illustrated in the accompanying drawing, in which:

Fig. 1 is a side elevation view of a basket with my improved handle applied thereto.

Fig. 2 is a view partially in end elevation and partially in vertical section taken on a line corresponding to line 2—2 of Fig. 1, illustrating the relation of the handle to the parts of the basket.

Fig. 3 is an enlarged fragmentary elevation of the handle, showing the structure thereof.

Fig. 4 is a fragmentary elevation looking from the right of Fig. 3.

Fig. 5 is an enlarged fragmentary section taken on a line corresponding to line 5—5 of Fig. 6, illustrating the details of the handle and its engagement with the outer hoop.

Fig. 6 is an enlarged fragmentary horizontal section taken on a line corresponding to line 6—6 of Fig. 5.

Referring to the drawing, numeral 1 represents a receptacle or basket commonly used for the marketing of fruit, having a removable cover 2.

In accordance with the usual practice, the basket 1 is provided with inner and outer rim members 3 and 4, respectively, which embrace the rim 5 thereof. The rim members 3 and 4 are commonly designated hoops and this term will be used to designate these members in the following description and claims.

The basket 1 and its component parts are made up of some fibrous material such as soft wood. While my improved handle is not limited for use with baskets of soft or fibrous material only it is particularly applicable to baskets made of such material.

The handle 6 is formed of relatively stiff resilient wire and is of substantially inverted U shape, the ends 7 of its arms 8 being turned inwardly at 9 to engage the bottom 10 of the receptacle 1 and terminating in up-turned bottom piercing and engaging prongs 11. The arms 8 of the handle 6 have return bends or loops therein providing downwardly projecting loop-like fingers 12. The fingers or loops 12 are adapted to be engaged between the rim 5 of the receptacle and the outer hoop 4, as illustrated in the drawing. At the upper ends of bases of these loops or fingers 12 are transverse triangularly disposed inwardly projecting loops 13 which are adapted to engage the cover 2. The base 14 of the cover engaging loop 13 constitutes an outwardly inclined shoulder which is adapted to resiliently engage and force the cover 2 into engagement with the top of the rim member 3 and rim 5, as illustrated by Figs. 2 and 5.

As illustrated by Fig. 4, the return downwardly extending portion 15 of each arm 8 is offset at the upper bend 16 so as to lie opposite the opening 17 of the loop or finger 12. At this point the arms 8 are provided with inwardly extending jaw-like bends 18 which are adapted to coact with the loop-like fingers 12 to clamp the top of the outer hoop 4 to hold the arms 8 securely in position relative thereto.

As illustrated by Fig. 6, the jaw 18 resiliently engages and distorts the top of the hoop 4 at 19 into the opening 17 between the sides 20 of the loop-like finger 12. It is to be particularly noted that while the top of the hoop 4 is distorted, as illustrated, neither the rim 5 nor the inner hoop 3 are distorted or pulled out of line in the slightest degree. This arrangement permits the easy engagement and disengagement of the cover to and from the cover retaining means.

In engaging the handle with the outer hoop 4, the finger portions of the loops are pushed inwardly between the rim and the outer hoop, the jaws 18 springing slightly outwardly to facilitate such engagement. After the top of the outer hoop is clamped between the jaws 18 and the loops 12, as pointed out above, the ends 7 are forced under the bottom 10 and the upturned prongs 11 are driven home to prevent their disengagement. Slight pressure on the arms 7 is all that is required for this purpose. The bottom surface of the jaw 18 constitutes a shoulder which bears on the top of the hoop 4 and, coacting with end 7 and bottom 10, fixes the vertical position of the arm relative to the basket.

With the parts thus arranged, the handle may be engaged without the aid of tools, is very securely retained without distorting the rim of the receptacle, and effectively retains the cover without preventing its removal and the handle is positively held in upright position.

The handle is applied without the aid of tools. The prongs are disposed so that they tend to draw into the wood, both as the result of the spring of the handle and any weight upon the handle. It will be noted that the prongs are inclined and that their ends are beveled so that this results.

My improved handle is very economical to produce, may be quickly and easily applied to the receptacle, and is effective in holding the cover in place.

The offsets 18 coacting with the members 20 of the loop firmly grip the upper edge or rim of the receptacle, indenting a portion thereof as shown in Fig. 6 so that the handle cannot be swung sidewise.

It is obvious that various changes and modifications may be made in the details of construction and design of the above specifically described embodiments of my invention without departing from the spirit thereof, such changes and modifications being restricted only by the scope of the following claims.

Having thus described my invention, what I claim as new and desire to secure by Letters Patent, is:

1. The combination with a receptacle having a rim encased by inner and outer hoops of fibrous material and a cover, of a resilient U-shaped wire handle, the arms of which have inturned ends terminating in upturned prongs engaging the bottom of said receptacle, said arms having elongated longitudinally disposed loops therein providing fingers engaging between the rim of said receptacle and said outer hoop and triangular transversely disposed inwardly projecting cover engaging loops at the bases of said fingers, said arms having inwardly extending bends opposite the openings in said fingers and coacting therewith to clamp the top of said outer hoop.

2. The combination with a receptacle having a rim encased by inner and outer hoops and a cover, of a resilient U-shaped handle, the arms of which have elongated longitudinally disposed loops therein providing fingers engaging between the rim of said receptacle and said outer hoop and inwardly projecting cover engaging loops, said arms having inwardly extending bends opposite the openings in said fingers and coacting therewith to clamp the edge of said outer hoop.

3. As an article of manufacture, a resilient U-shaped receptacle handle, the arms of which have elongated longitudinally disposed loops therein providing outer rim hoop engaging fingers, inwardly projecting cover retaining loops at the upper ends of said fingers, and inwardly projecting jaw-like offsets disposed opposite said hoop engaging fingers and coacting therewith to clamp the top of said hoop.

EUGENE F. PRINDLE.